US008672800B2

(12) United States Patent
Nomura et al.

(10) Patent No.: US 8,672,800 B2

(45) Date of Patent: Mar. 18, 2014

(54) CARRIER

(75) Inventors: Shinichi Nomura, Anjo (JP); Takaaki Kawashima, Anjo (JP); Hirotaka Shiratori, Toyota (JP); Masabumi Nishigaya, Nagoya (JP)

(73) Assignees: Aisin Aw Co., Ltd., Anjo (JP); Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/985,460

(22) PCT Filed: Feb. 28, 2012

(86) PCT No.: PCT/JP2012/054933

§ 371 (c)(1),
(2), (4) Date: Aug. 14, 2013

(87) PCT Pub. No.: WO2012/132712

PCT Pub. Date: Oct. 4, 2012

(65) Prior Publication Data

US 2013/0324352 A1 Dec. 5, 2013

(30) Foreign Application Priority Data

Mar. 25, 2011 (JP) ................................ 2011-068125

(51) Int. Cl.
*F16H 57/08* (2006.01)

(52) U.S. Cl.
USPC .......................................................... 475/331

(58) Field of Classification Search
CPC ........................... F16H 57/082; F16H 2057/08
USPC ......................................................... 475/331
See application file for complete search history.

(56) References Cited

U.S. PATENT DOCUMENTS

| | | | | |
|---|---|---|---|---|
| 7,316,629 | B2 | 1/2008 | Nakagawa et al. | |
| 7,534,189 | B2 | 5/2009 | Inagaki et al. | |
| 2004/0023749 | A1 * | 2/2004 | Zelikov et al. | 475/331 |
| 2004/0235610 | A1 | 11/2004 | Jang et al. | |
| 2007/0111847 | A1 | 5/2007 | Inagaki et al. | |
| 2009/0084154 | A1 * | 4/2009 | Nakajima et al. | 72/328 |
| 2010/0304918 | A1 * | 12/2010 | Burgman et al. | 475/331 |

FOREIGN PATENT DOCUMENTS

| | | |
|---|---|---|
| JP | U-58-82558 | 6/1983 |
| JP | U-6-25643 | 4/1994 |
| JP | A-2001-182809 | 7/2001 |
| JP | A-2004-347107 | 12/2004 |
| JP | A-2006-125425 | 5/2006 |
| JP | A-2007-139061 | 6/2007 |

OTHER PUBLICATIONS

Apr. 3, 2012 International Search Report issued in International Patent Application No. PCT/JP2012/054933.

Mar. 22, 2012 Japanese Office Action issued in Japanese Patent Application No. 2011-068125 (with partial translation).

* cited by examiner

*Primary Examiner* — Edwin A Young

(74) *Attorney, Agent, or Firm* — Oliff PLC

(57) ABSTRACT

A carrier is implemented which is capable of reducing the number of parts and the number of bonding steps. The carrier includes a pair of holding members that hold from both sides in an axial direction L a pinion shaft supporting a pinion gear. A first holding member as one of the pair of holding members includes a coupling portion extending in the axial direction L toward a second holding member as the other holding member. The second holding member is a disc-like member, and has an external outer peripheral gear integrally formed in its outer peripheral portion. The coupling portion is bonded to a coupling bonding portion provided on a radially inner side R1 of the outer peripheral gear in the second holding member.

4 Claims, 4 Drawing Sheets

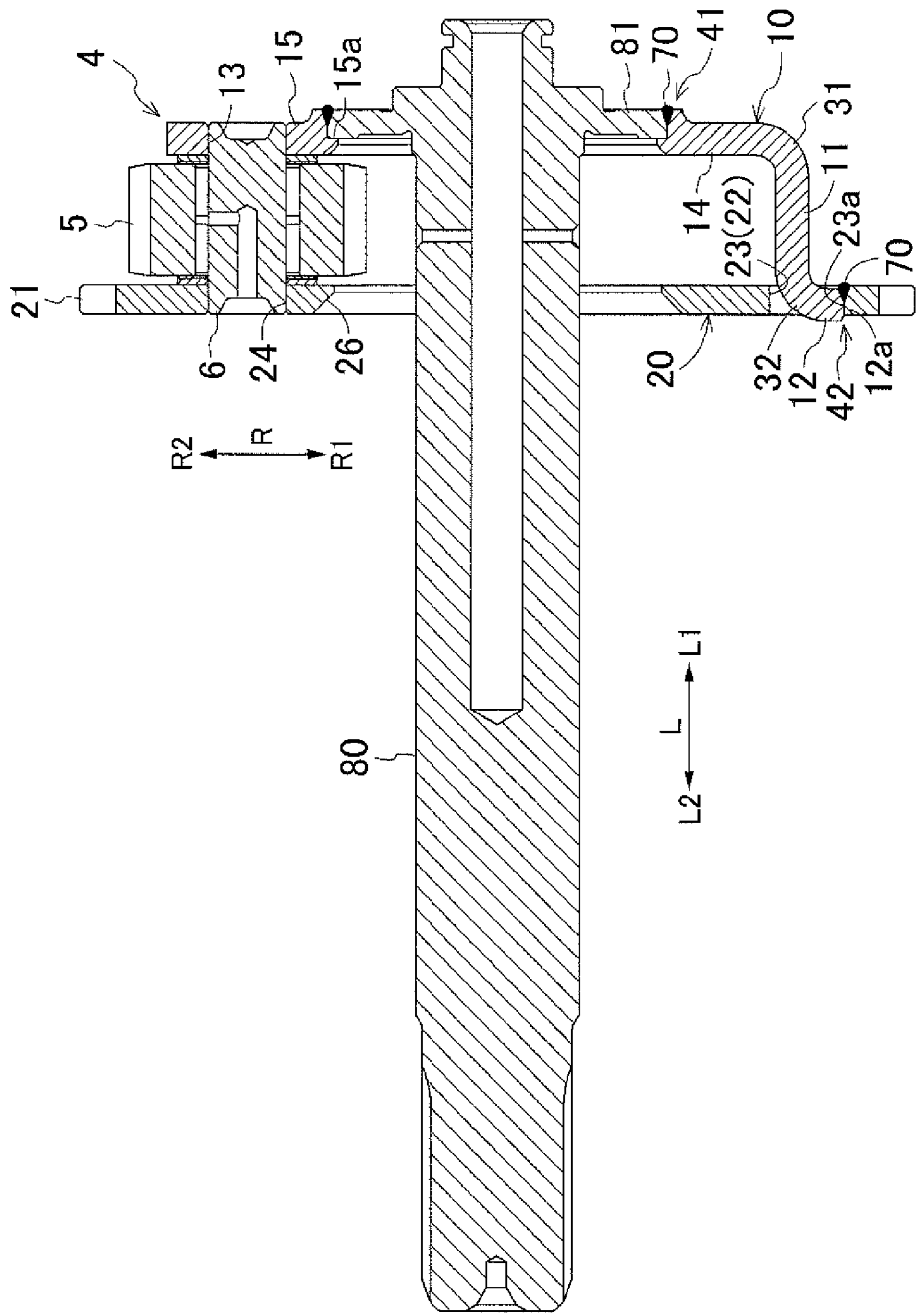
F I G . 1
4
13
15
15a
81
70
41
10
31
11
14
23(22)
23a
70
5
21
6
24
26
20
32
12
42
12a
R2
R
R1
80
L
L1
L2

4
13
6
16
14
10
31
11
5
23(22)
23a
12a
21
24
25
25a
81
41
70
12
70
42
20
R2
R
R1
80
L2
L
L1

CARRIER

INCORPORATION BY REFERENCE

The disclosure of Japanese Patent Application No. 2011-068125 filed on Mar. 25, 2011 including the specification, drawings and abstract is incorporated herein by reference in its entirety.

BACKGROUND OF THE INVENTION

The present invention relates to carriers that are used in planetary gear mechanisms and are fixed so that the carriers rotate together with a rotating shaft.

DESCRIPTION OF THE RELATED ART

As a related art of such carriers, there is, e.g., a technique described in Japanese Patent Application Publication No. 2007-139061 (JP 2007-139061 A) shown below. In the description of this section "Description of the Related Art," reference characters or names in JP 2007-139061 A are shown in parentheses "( )" as appropriate for reference. JP 2007-139061 A describes a carrier including a pair of holding members (carrier plates 21, 22) that hold from both sides in the axial direction a pinion shaft (pinion shafts PS) supporting a pinion gear (pinions P1), and the pair of holding members are bonded together via a coupling portion (carrier bridges 23) formed in one of the holding members (carrier plate 22).

In the configuration used in JP 2007-139061 A, an outer peripheral gear (annular gear 25) is bonded to the outer peripheral edge of the one holding member (carrier plate 22), and the outer peripheral gear meshes with an input gear (18*b*) of an oil pump (oil pump device 18). JP 2007-139061 A thus implements the configuration in which the oil pump is driven by rotation of the carrier.

In the configuration of JP 2007-139061 A, the outer peripheral gear and the holding members are separate members. Thus, when manufacturing the carrier, the step of bonding the outer peripheral gear and the holding member is required in addition to the step of bonding the pair of holding members. That is, in the configuration of JP 2007-139061 A, providing the outer peripheral gear increases the number of parts and the number of bonding steps accordingly.

SUMMARY OF THE INVENTION

It is therefore desired to implement a carrier capable of reducing the number of parts and the number of bonding steps.

According to an aspect of the present invention, a carrier that is used in a planetary gear mechanism and is fixed so as to rotate together with a rotating shaft includes: a pair of holding members that hold from both sides in an axial direction a pinion shaft supporting a pinion gear. In the carrier, a first holding member as one of the pair of holding members includes a coupling portion extending in the axial direction toward a second holding member as the other holding member, the second holding member is a disc-like member, and has an external outer peripheral gear integrally formed in its outer peripheral portion, and the coupling portion is bonded to a coupling bonding portion provided on a radially inner side of the outer peripheral gear in the second holding member.

In the present application, in the case where a certain direction is defined as a reference direction, the term "extend" in the certain direction regarding the shape of a member is used as a concept that is not limited to the shapes in which the member extends in a direction parallel to the reference direction, and that includes the shapes in which the member extends in a direction crossing the reference direction and the crossing angle is within a predetermined range (e.g., less than 5 degrees or less than 10 degrees).

According to the aspect, since the outer peripheral gear is formed integrally with the holding member, the carrier having the outer peripheral gear can be implemented without increasing the number of parts and the number of bonding steps in manufacturing the carrier as compared to the case where the carrier does not have the outer peripheral gear.

In this case, the second holding member as a holding member having the outer peripheral gear formed integrally therewith is a disc-like member. Therefore, at least part of the processing step required to form the outer peripheral gear can be easily made common to the manufacturing process of the second holding member. For example, in the case of manufacturing the second holding member by punching by press work, the outer peripheral gear can also be formed by the punching. This allows a common processing device to be used, and can suppress manufacturing cost. Thus, the configuration in which the outer peripheral gear is formed integrally with one of the pair of holding members can be implemented while the manufacturing cost is suppressed.

According to the aspect, the coupling bonding portion as a bonding region with the coupling portion is provided on the radially inner side of the outer peripheral gear in the second holding member. This allows the second holding member to properly have both a function to hold the pinion shaft and a function to serve as the outer peripheral gear to engage with another member.

Moreover, according to the aspect, the outer peripheral gear is formed integrally with the holding member. This is also advantageous in that strength and durability are easily ensured, in addition to the above effect of reducing the number of parts and the number of bonding steps.

The rotating shaft may include a collar-like portion that is extended in a radial direction with respect to an outer peripheral surface of the rotating shaft, the coupling bonding portion may include an insertion opening in which a distal end of the coupling portion is inserted, at least one of the first holding member and the second holding member may include a fitting portion that is fitted on the collar-like portion, and the collar-like portion and the fitting portion may be bonded together by welding and the coupling portion and the insertion opening may be bonded together by welding.

According to this configuration, since each part is bonded by welding that requires a welding device, an increase or decrease in the number of bonding steps relatively greatly affects an increase or decrease in the manufacturing cost. In this regard, according to the present invention, the carrier having the outer peripheral gear can be implemented without increasing the number of bonding steps in manufacturing the carrier as compared to the case where the carrier does not have the outer peripheral gear, as described above. Accordingly, this configuration is particularly suitable for such a carrier as described above.

In the configuration in which the collar-like portion and the fitting portion are bonded together by welding and the coupling portion and the insertion opening are bonded together by welding as described above, the first holding member may include the fitting portion, the coupling portion may include a bent portion that is bent so that the distal end extends toward a radially outer side, and an outer end face as an end face of the distal end which faces the radially outer side, and the outer end face of the coupling portion and an inner surface of the insertion opening which faces the radially inner side may be bonded together so as to face each other in the radial direction.

According to this configuration, in the case where the direction from the second holding member toward the first holding member in the axial direction is a target direction, a bonding surface between the coupling bonding portion and the coupling portion can be a surface extending in the axial direction, and the bonding surface can be positioned so as not to overlap the coupling portion as viewed in the axial direction from a target direction side. Thus, the bonding surface between the coupling bonding portion and the coupling portion, which extends in the axial direction, can be subjected to welding in the axial direction from the target direction side, whereby the welding depth direction can be made parallel to the bonding surface. As a result, bonding depth can be properly controlled, and bonding reliability can be enhanced.

According to this configuration, not only a bonding portion between the collar-like portion and the fitting portion but also a bonding portion between the coupling bonding portion and the coupling portion can be easily positioned so as to be covered by neither the first holding member nor the second holding member as viewed in the axial direction from the target direction side. Thus, welding of these two bonding portions can be easily performed from the target direction side, which can simplify the welding step, and can suppress the manufacturing cost.

In the configuration in which the collar-like portion and the fitting portion are bonded together by welding and the coupling portion and the insertion opening are bonded together by welding as described above, an axial first direction may be a direction from the holding member not provided with the fitting portion toward the holding member provided with the fitting portion in the axial direction, a welding region in a bonding portion between the collar-like portion and the fitting portion may be a region including an end of the bonding portion on an axial first direction side, and a welding region in a bonding portion between the coupling bonding portion and the coupling portion may be a region including an end of the bonding portion on the axial first direction side.

According to this configuration, welding of both the bonding portion between the collar-like portion and the fitting portion and the bonding portion between the coupling bonding portion and the coupling portion can be performed from the axial first direction side when manufacturing the carrier. This can simplify the welding step, and can suppress the manufacturing cost.

BRIEF DESCRIPTION OF THE DRAWINGS

FIG. 1 is a schematic view showing a sectional shape of a carrier according to an embodiment of the present invention, taken along an axial direction;

DETAILED DESCRIPTION OF THE EMBODIMENTS

Figure 2:
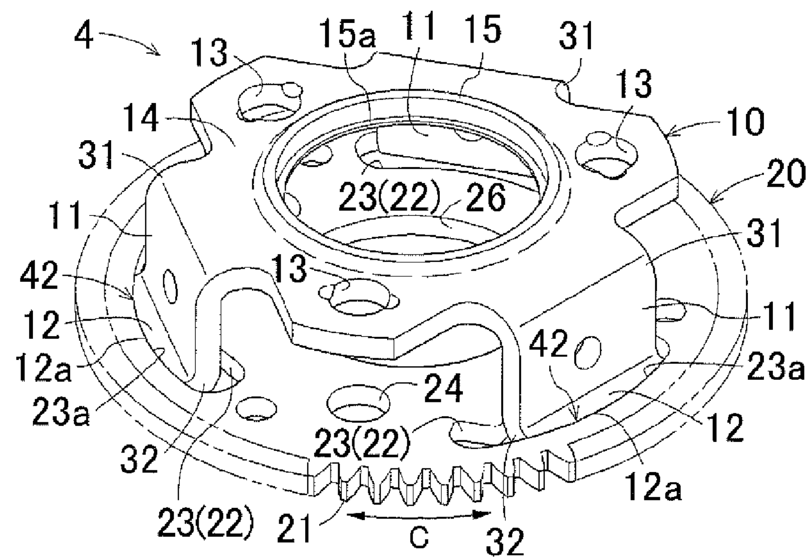
FIG. 2 is a perspective view of the carrier according to the embodiment of the present invention.
Figure 3:
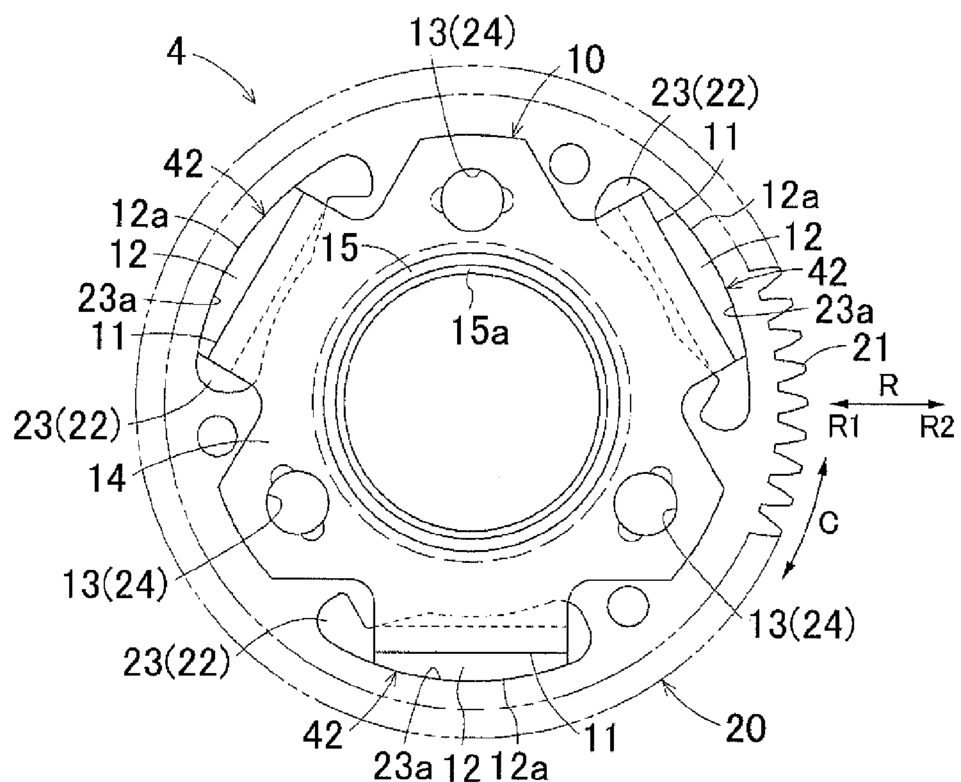
FIG. 3 is a view showing the carrier according to the embodiment of the present invention as viewed from an axial first direction.

Embodiments of a carrier according to the present invention will be described with reference to the accompanying drawings. The embodiments will be described with respect to an example in which the carrier according to the present invention is applied to a single-pinion type planetary gear mechanism. As shown in FIGS. 1 to 3, a carrier 4 according to an embodiment includes a pair of holding members 10, 20 holding a pinion shaft 6 from both sides in an axial direction L, and forms a rotating element of a single-pinion type planetary gear mechanism 1 (see FIG. 4). That is, the carrier 4 is used in the planetary gear mechanism 1. The carrier 4 according to the present embodiment can be provided with an outer peripheral gear 21 while the number of parts and the number of bonding steps are reduced. The configuration of the carrier 4 according to the present embodiment will be described in detail below. The figures that are referred to in the following description schematically show the configuration required to understand the present invention. Part of the configuration is omitted as appropriate or is shown in a simplified form as appropriate in the figures.

In the following description, the "axial direction L," the "circumferential direction C," and the "radial direction R" are defined based on the central axis of a rotating shaft 80 to which the carrier 4 is fixed, unless otherwise specified (see FIGS. 1 and 3). The "radially inner side R1" refers to the inner side in the radial direction R, and the "radially outer side R2" refers to the outer side in the radial direction R. The "axial first direction L1" refers to the direction from the holding member not provided with a fitting portion 15 (described later) toward the holding member provided with the fitting portion 15 in the axial direction L. In the present embodiment, the "axial first direction L1" refers to the direction from the second holding member 20 toward the first holding member 10 along the axial direction L (the rightward direction in FIG. 1). The "axial second direction L2" refers to the opposite direction to the axial first direction L1. In the present embodiment, the "axial second direction L2" refers to the direction from the first holding member 10 toward the second holding member 20 along the axial direction L (the leftward direction in FIG. 1).

The direction of each member refers to the direction in the state where that member is mounted in the planetary gear mechanism 1 and the planetary gear mechanism 1 is attached to the rotating shaft 80. The direction of each member and the positional relation between two members (e.g., "parallel", and "perpendicular,") are used as a concept including a displacement according to a manufacturing error. Such a manufacturing error is caused by, e.g., a displacement within the range of tolerance of the dimensions or the attachment position.

1. Configuration of Carrier

As shown in FIG. 1, the carrier 4 according to the present embodiment includes the pair of holding members 10, 20 holding from both sides in the axial direction L the pinion shaft 6 supporting a pinion gear 5. The first holding member 10 as one of the pair of holding members 10, 20 includes a coupling portion 11 extending in the axial direction L toward the second holding member 20 as the other holding member. The pair of holding members 10, 20 are bonded together via the coupling portion 11, thereby forming a carrier case including a pinion accommodating space accommodating the pinion gear 5 therein.

The first holding member 10 includes a body portion 14 extending in a direction perpendicular to the axial direction L, and the coupling portion 11 extending toward an axial second direction L2 side in the axial direction L from the body portion 14. In the present embodiment, the first holding member 10 includes a plurality of the coupling portions 11. As shown in FIGS. 2 and 3, the body portion 14 is formed in the shape of a plate having a substantially triangular (more precisely, substantially equilateral-triangular) outer peripheral edge as viewed in the axial direction L. A first hole 13 in which the pinion shaft 6 is inserted is formed at a position corresponding to each vertex of the triangle. Specifically, three first holes 13 are arranged at the same positions in the radial direction R at regular intervals along the circumferential direction C. The fitting portion 15 (described in detail later) that fixes the carrier 4 to the rotating shaft 80 is formed in the central portion (the central portion in the radial direction R) of the body portion 14.

As shown in FIG. 3, each of the coupling portions 11 is formed between corresponding two of the first holes 13 which adjoin each other in the circumferential direction C. Specifically, the three coupling portions 11 are arranged at the same positions in the radial direction R at regular intervals along the circumferential direction C. In the present embodiment, the coupling portions 11 are formed so as to extend parallel to the axial direction L. The coupling portions 11 are formed integrally with the body portion 14.

A first bent portion 31, forming a boundary portion between the coupling portion 11 and the body portion 14 which extend so as to cross each other (in this example, perpendicularly to each other), is formed in a boundary region between the coupling portion 11 and the body portion 14. In this example, the bent angle of the first bent portion 31 is 90 degrees. A distal end 12 of the coupling portion 11 is bonded to a coupling bonding portion 22 (described in detail later) formed in the second holding member 20, whereby the pair of holding members 10, 20 are bonded together. Specifically, as shown in FIGS. 1 and 3, an outer end face **12*a* as an end face of the distal end 12 which faces the radially outer side R2 serves as a bonding surface that is bonded to the coupling bonding portion 22. The first holding member 10** can be manufactured by, e.g., punching or bending by press work, and cutting by using a plate-like member (e.g., a metal plate).

As shown in FIGS. 1 to 3, the second holding member 20 is a disc-like member formed in the shape of a disc. The second holding member 20 is bonded to the first holding member 10 so that the plate surface of the second holding member 20 is parallel to that of the body portion 14 of the first holding member 10 similarly formed in the shape of a plate. The second holding member 20 is thus placed so as to extend in a direction perpendicular to the axial direction L.

The outer peripheral gear 21 is integrally formed in the outer peripheral portion of the second holding member 20. In this example, the outer peripheral gear 21 is an external spur gear. Since the outer peripheral gear 21 is provided, an oil pump 90 (see FIG. 4) can be driven by using rotation of the carrier 4, as described below.

The coupling bonding portion 22 that is bonded to the distal end 12 of the coupling portion 11 is formed on the radially inner side R1 of the outer peripheral gear 21 in the second holding member 20. In the present embodiment, the coupling bonding portion 22 includes an insertion opening 23, and the insertion opening 23 is formed so as to open at least toward the first holding member 10 in the axial direction L (i.e., in the axial first direction L1). A total of three insertion openings 23 are respectively provided for the three coupling portions 11 of the first holding member 10. The insertion openings 23 are arranged at the same positions in the radial direction R at regular intervals along the circumferential direction C.

Each insertion opening 23 is formed so that the distal end 12 of a corresponding one of the coupling portions 11 overlaps the insertion opening 23 along the entire length of the distal end 12 in the circumferential direction C, as viewed in the axial direction L. The entire distal end 12 of the coupling portion 11 can thus be inserted into the insertion opening 23. The surface of the insertion opening 23 which extends in the axial direction L serves as a bonding surface that is bonded to the distal end 12 of the coupling portion 11.

Specifically, in the present embodiment, the insertion opening 23 is a hole extending through the second holding member 20 in the axial direction L. In this example, the insertion opening 23 is formed so that its sectional shape perpendicular to the axial direction L is uniform along the axial direction L, and the insertion opening 23 has an arc-shaped surface on the radially outer side R2, as shown in FIG. 3. That is, as shown in FIGS. 2 and 3, the insertion opening 23 includes an inner surface **23*a* facing the radially inner side R1, and the inner surface 23*a* is the arc-shaped surface in this example. With the distal end 12 of the coupling portion 11 being placed so as to fit on the inner surface 23*a* of the insertion opening 23, the inner surface 23*a* of the insertion opening 23 and the outer end face 12*a* of the coupling portion 11, which face each other in the radial direction R, are bonded together, thereby a second bonding portion 42 as a bonding portion between the first holding member 10 and the second holding member 20** is formed.

The second holding member 20 has a second hole 24 in which the pinion shaft 6 is inserted, at the same position in both the circumferential direction C and the radial direction R as the first hole 13 formed in the first holding member 10. Specifically, three second holes 24 are arranged at the same positions in the radial direction R at regular intervals along the circumferential direction C so as to overlap the first holes 13 as viewed in the axial direction L. In the present embodiment, the carrier 4 formed by bonding the first holding member 10 and the second holding member 20 can thus hold the three pinion shafts 6 from both sides in the axial direction L. The second holding member 20 can be manufactured by, e.g., punching by press work by using a plate-like member (e.g., a metal plate).

In the present embodiment, as shown in FIG. 1, the pinion shaft 6 supporting the pinion gear 5 is fixed such that relative rotation of the pinion shaft 6 with respect to the first holding member 10 and the second holding member 20 is restricted. Specifically, each pinion shaft 6 is fitted (e.g., tight fitted by press fit) on the inner peripheral surfaces of the first hole 13 formed in the first holding member 10 and the second hole 24 formed in the second holding member 20, and is fixed to both the first hole 13 and the second hole 24 so as not to be rotatable relative to the first and second holes 13, 24. Each pinion shaft 6 supports the pinion gear 5 placed radially outward of that pinion shaft 6 so that the pinion gear 5 can rotate relative to the pinion shaft 6. A bearing (in this example, a bush) is placed between the pinion gear 5 and the pinion shaft 6, and a washer is placed between the pinion gear 5 and the first holding member 10 and between the pinion gear 5 and the second holding member 20.

As shown in FIG. 1, the carrier 4 formed by bonding the first holding member 10 and the second holding member 20 is fixed to the rotating shaft 80 so as to rotate together with the rotating shaft 80. Specifically, the rotating shaft 80 has a collar-like portion 81 that is extended in the radial direction R with respect to the outer peripheral surface of the rotating shaft 80. The collar-like portion 81 is formed in the shape of a flange whose thickness in the axial direction L is uniform along the radial direction R, and has a cylindrical outer peripheral surface. As described above, the fitting portion 15 is formed in the central portion (the central portion in the radial direction R) of the body portion 14 of the first holding member 10. In this example, the fitting portion 15 is a hole extending through the body portion 14 in the axial direction L, and has a cylindrical inner peripheral surface. The fitting portion 15 and the collar-like portion 81 are bonded together such that the inner peripheral surface of the fitting portion 15 fits (e.g., tight fits by press fit) on the outer peripheral surface of the collar-like portion 81, thereby a first bonding portion 41 is formed as a bonding portion between the first holding member 10 and the rotating shaft 80. The first holding member 10 is fixed to the rotating shaft 80 via the first bonding portion 41.

In the present embodiment, as shown in FIG. 1, the fitting portion 15 has an annular surface 15*a* having an annular shape, located on the axial second direction L2 side of the inner peripheral surface fitted on the outer peripheral surface of the collar-like portion 81, and facing an axial first direction L1 side. That is, the inner peripheral surface of the fitting portion 15 has a stepped portion so as to have a larger diameter on the axial first direction L1 side and a smaller diameter on the axial second direction L2 side. The annular surface 15*a* is formed by the stepped portion. The collar-like portion 81 contacts the annular surface 15*a* from the axial first direction L1 side, whereby the first holding member 10 is fixed to the rotating shaft 80. In the present embodiment, the first holding member 10 is thus positioned with respect to the rotating shaft 80 and fixed thereto by the fitting portion 15 in the radial direction R and is also positioned with respect to the rotating shaft 80 and fixed thereto in the axial direction L by using the fitting portion 15.

As described above, in the present embodiment, the first holding member 10 is directly fixed to the rotating shaft 80, whereby the carrier 4 formed by bonding the first holding member 10 and the second holding member 20 is fixed to the rotating shaft 80. As shown in FIG. 1, the rotating shaft 80 is placed so as to extend though the carrier 4 in the axial direction L, and a rotating-shaft insertion hole 26 having a larger diameter than the outer peripheral surface of the rotating shaft 80 is formed in the region of the second holding member 20 through which the rotating shaft 80 extends.

In the present embodiment, both the first bonding portion 41 as the bonding portion between the first holding member 10 and the rotating shaft 80, and the second bonding portion 42 as the bonding portion between the first holding member 10 and the second holding member 20 are the bonding portions by welding. That is, with the fitting portion 15 being fitted (externally fitted) on the outer peripheral surface of the collar-like portion 81, the collar-like portion 81 and the fitting portion 15 are bonded together by welding to form the first bonding portion 41. With the distal end 12 of the coupling portion 11 being fitted (internally fitted) on the inner surface 23*a* of the coupling bonding portion 22 (the insertion opening 23), the coupling portion 11 and the insertion opening 23 are bonded together by welding to form the second bonding portion 42. The welding can be performed by, e.g., electron beam welding, and laser welding.

In order to properly control the bonding depth and enhance bonding reliability, it is desirable to perform such welding so that the welding depth direction is parallel to the bonding surface. In view of this, the present embodiment uses a configuration in which the coupling portion 11 has a second bent portion 32 that is bent so that the distal end 12 extends toward the radially outer side R2. In the present embodiment, the bend angle of the second bent portion 32 is 90 degrees, and the distal end 12 of the coupling portion 11 is placed so as to extend parallel to the radial direction R toward the radially outer side R2. The outer end face 12*a* as the end face of the distal end 12 which faces the radially outer side R2 is bonded to the inner surface 23*a* of the insertion opening 23 so that the outer end face 12*a* and the inner surface 23*a* face each other in the radial direction R (in this example, face and contact each other). In the present embodiment, the outer end face 12*a* of the distal end 12 is formed in an arc shape having the same diameter as the inner surface 23*a* by, e.g., cutting. The outer end face 12*a* contacts the inner surface 23*a* from the radially inner side R1 along the entire length of the outer end face 12*a* in the circumferential direction C. In the present embodiment, the second bent portion 32 corresponds to the "bent portion" in the present invention.

The coupling portion 11 has the second bent portion 32 as described above. Thus, as shown in FIG. 1, the bonding surface between the outer end face 12*a* and the inner surface 23*a* (the bonding surface of the second bonding portion 42), which extends in the axial direction L, can be positioned so as not to overlap the coupling portion 11 as viewed in the axial direction L from the axial first direction L1 side. In other words, the bonding surface of the second bonding portion 42 is positioned so as to be covered by neither the first holding member 10 nor the second holding member 20 as viewed in the axial direction L from the axial first direction L1 side. Thus, welding of the second bonding portion 42 can be performed from the axial first direction L1 side so that the welding depth direction is parallel to the bonding surface.

In the present embodiment, as shown in FIG. 1, the bonding surface between the collar-like portion 81 and the fitting portion 15 (the bonding surface of the first bonding portion 41), which extends in the axial direction L, is also positioned so as to be covered by neither the first holding member 10 nor the second holding member 20 as viewed in the axial direction L from the axial first direction L1 side. Thus, welding of the first bonding portion 41 can also be performed from the axial first direction L1 side so that the welding depth direction is parallel to the bonding surface.

As described above, in the present embodiment, not only the bonding portion between the collar-like portion 81 and the fitting portion 15 (the first bonding portion 41) but also the bonding portion between the coupling bonding portion 22 and the coupling portion 11 (the second bonding portion 42) are positioned so as to be covered by neither the first holding member 10 nor the second holding member 20 as viewed in the axial direction L from the axial first direction L1 side. Thus, both the first bonding portion 41 and the second bonding portion 42 can be formed by welding from the axial first direction L1 side, and in the present embodiment, bonding of both bonding portions is performed by welding from the axial first direction L1 side.

That is, as schematically shown in FIG. 1, a welding region 70 in the bonding portion between the collar-like portion 81 and the fitting portion 15 (the first bonding portion 41) is a region including an end of this bonding portion (the first bonding portion 41) on the axial first direction L1 side, and a welding region 70 in the bonding portion between the coupling bonding portion 22 and the coupling portion 11 (the second bonding portion 42) is a region including an end of this bonding portion (the second bonding portion 42) on the axial first direction L1 side.

In the present embodiment, as shown in FIG. 1, the distal end 12 of the coupling portion 11 is offset with respect to the insertion opening 23 in the axial second direction L2 in order to suppress the flow of a material melted during welding to the radially outer side R2 toward the outer peripheral gear 21. That is, the end face of the distal end 12 on the axial first direction L1 side is shifted to the axial second direction L2 side with respect to the end face of the insertion opening 23 on the axial first direction L1 side. This suppresses the flow of the material melted during welding toward the outer peripheral gear 21 and adhesion of the material to the outer peripheral gear 21 during formation of the second bonding portion 42.

2. Configuration of Planetary Gear Mechanism

Figure 4:
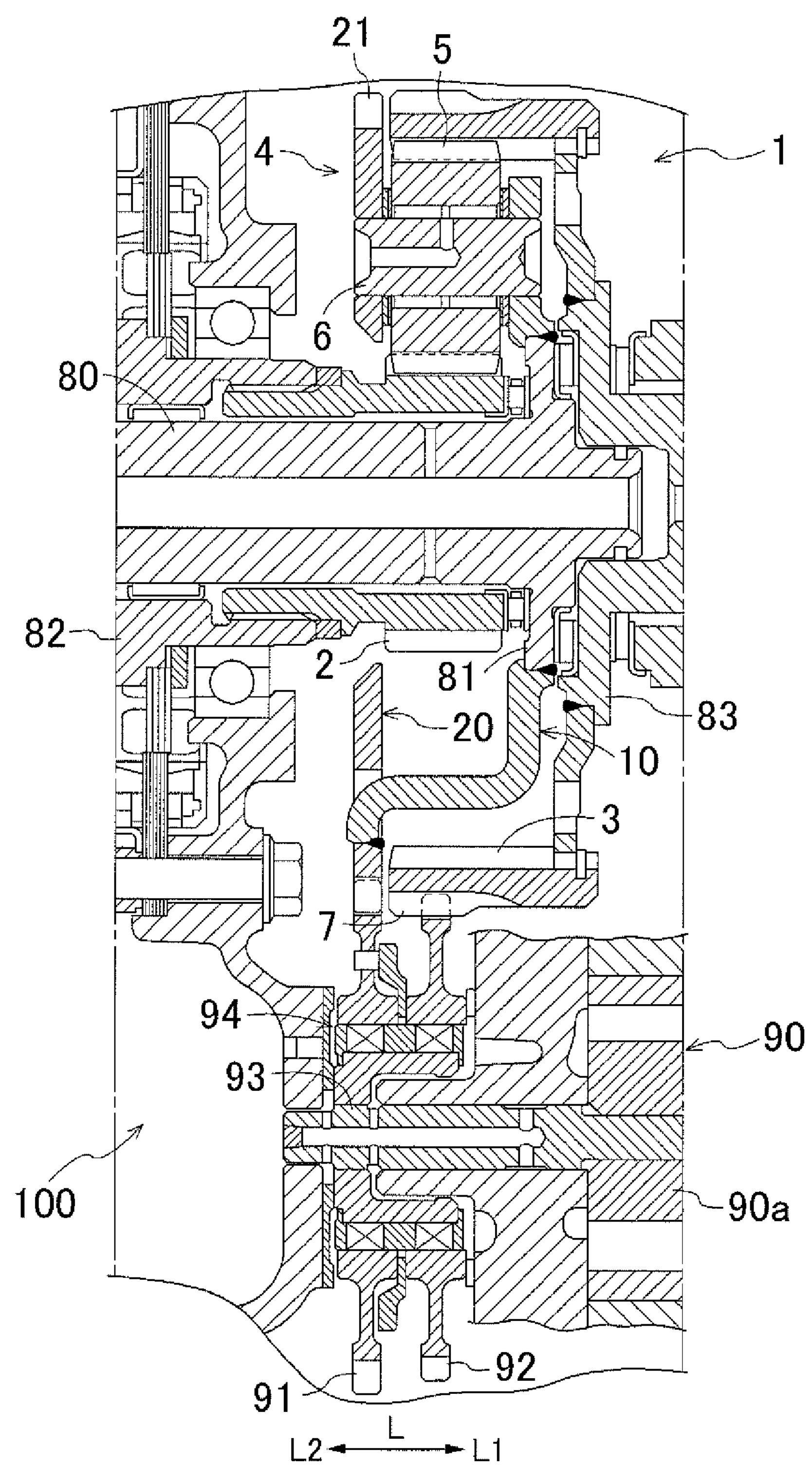
FIG. 4 is a schematic view showing a sectional shape of a part of a drive device according to the embodiment of the present invention, taken along the axial direction.

The configuration of the planetary gear mechanism 1 including such a carrier 4 as described above will be described with reference to FIG. 4. As shown in FIG. 4, the planetary gear mechanism 1 according to the present embodiment is a single-pinion type planetary gear mechanism placed coaxially with the rotating shaft 80. That is, the planetary gear mechanism 1 has three rotating elements, namely the carrier 4 supporting the plurality of (in this example, three) pinion gears 5, a sun gear 2 and a ring gear 3 which mesh with the pinion gears 5.

Although detailed description is omitted, in the present embodiment, the planetary gear mechanism 1 is provided in a drive device 100 for hybrid vehicles. The sun gear 2 is drivingly coupled to a rotor shaft 82 of a rotating electrical machine (not shown) so as to rotate together with the rotor shaft 82. The rotating shaft 80 to which the carrier 4 is fixed is drivingly coupled to an internal combustion engine (not shown). The ring gear 3 is drivingly coupled to a distribution output member 83 drivingly coupled to wheels (not shown), so as to rotate together with the distribution output member 83. The planetary gear mechanism 1 functions as a power distribution mechanism, part of the torque of the internal combustion engine which is transferred to the carrier 4 via the rotating shaft 80 is distributed to the rotating electrical machine via the sun gear 2, and the remaining torque is distributed to the distribution output member 83 via the ring gear 3. The vehicle travels as the torque transferred to the distribution output member 83 is transferred to the wheels. A drive gear 7 is formed on the outer peripheral surface of a cylindrical member having the ring gear 3.

As shown in FIG. 4, the drive device 100 is provided with the oil pump 90 on a different axis from that of the planetary gear mechanism 1. The oil pump 90 is a mechanical pump that operates by torque that is transferred to a pump drive shaft 93 coupled to a pump rotor 90*a*. The oil pump 90 is configured so as to generate a fluid pressure required to both lubricate and cool members forming the drive device 100.

In the present embodiment, a one-way clutch set 94 is placed on a power transmission path between the pump drive shaft 93 and the planetary gear mechanism 1. Although detailed description is omitted, this one-way clutch set 94 is formed by two one-way clutches arranged next to each other in the axial direction L, and in these two one-way clutches, relative rotation of an outer race with respect to an inner race is restricted to the same direction (hereinafter referred to as the "target direction"). Both inner races of the two one-way clutches (in the example shown in FIG. 4, the inner races are unified) are placed so as to rotate together with the pump drive shaft 93.

A first input gear 91 meshing with the outer peripheral gear 21 of the carrier 4 is formed on the outer peripheral surface of the outer race of one of the two one-way clutches, and a second input gear 92 meshing with the drive gear 7 rotating together with the ring gear 3 is formed on the outer peripheral surface of the outer race of the other one-way clutch.

Thus, when only one of the first input gear 91 and the second input gear 92 rotates in the target direction, the oil pump 90 is driven by rotation of this input gear. When both the first input gear 91 and the second input gear 92 rotate in the target direction, the oil pump 90 is driven by rotation of either the first input gear 91 or the second input gear 92, whichever has a higher rotational speed. That is, the present embodiment is configured so that a device placed on a different axis from that of the planetary gear mechanism 1 (in this example, the oil pump 90) is driven by using rotation of the carrier 4 and rotation of the ring gear 3.

3. Other Embodiments

Lastly, other embodiments according to the present invention will be described below. It is not intended that the characteristics disclosed in each of the following embodiments can be used only in that embodiment, but can be applied to the other embodiments as long as no inconsistency arises.

(1) The above embodiment is described with respect to an example in which the first holding member 10 includes the fitting portion 15. However, embodiments of the present invention are not limited to this, and the rotating shaft 80 may be provided with two collar-like portions 81, and both the first holding member 10 and the second holding member 20 may have a fitting portion. Alternatively, the first holding member 10 may not have the fitting portion, and only the second holding member 20 may have a fitting portion.

Figure 5:
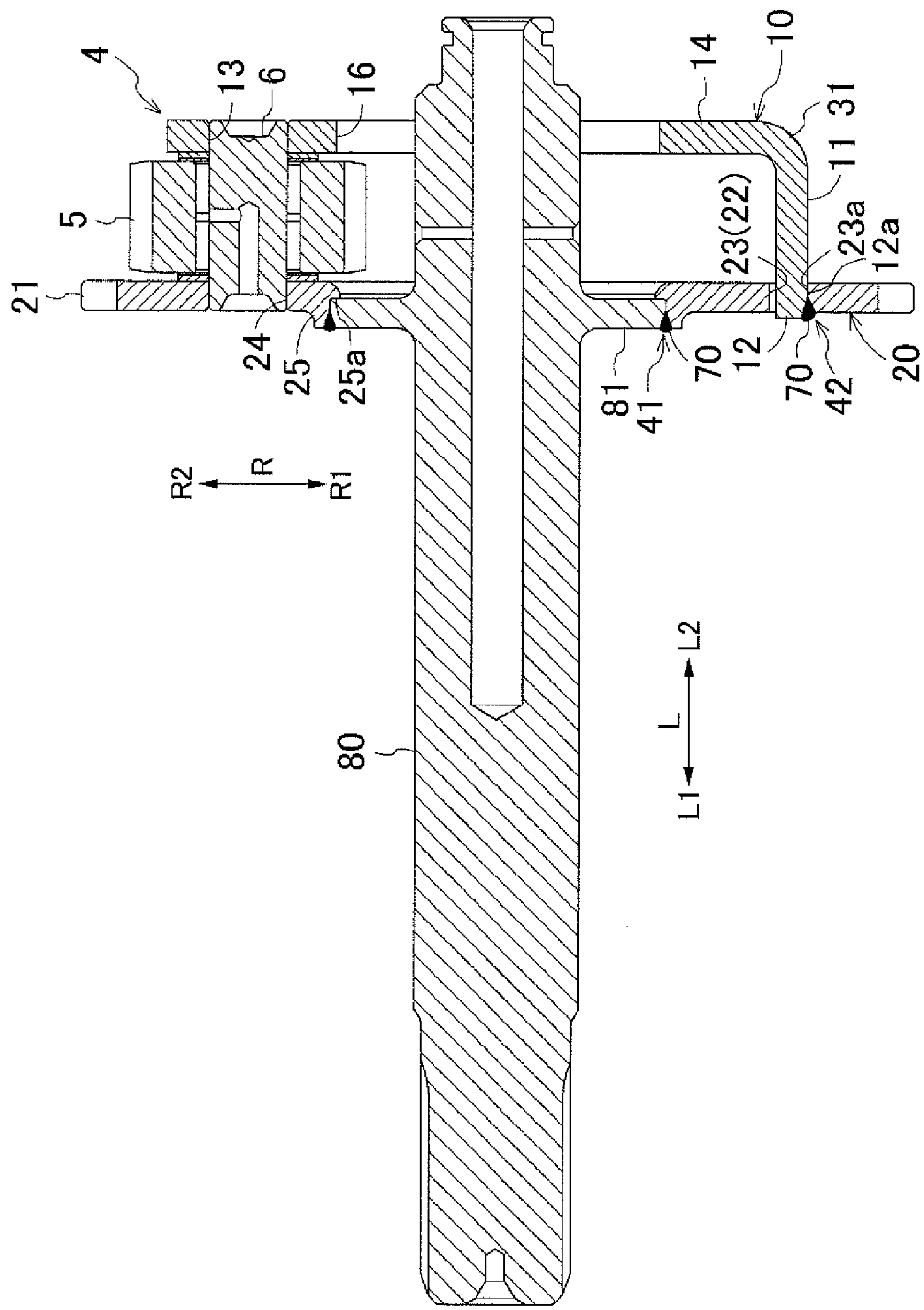
FIG. 5 is a schematic view showing a sectional shape of a carrier according to another embodiment of the present invention, taken along an axial direction.

FIG. 5 shows an example of the configuration in which the first holding member 10 has no fitting portion, and the second holding member 20 has a fitting portion 25 that is fitted on the collar-like portion 81 of the rotating shaft 80. In the example shown in FIG. 5, unlike the above embodiment, the direction from the holding member having no fitting portion toward the holding member having the fitting portion in the axial direction L is the direction from the first holding member 10 toward the second holding member 20 along the axial direction L (the leftward direction in FIG. 5), which is the opposite direction to that in the above embodiment. The fitting portion 25 provided in the second holding member 20 has a configuration similar to that of the fitting portion 15 provided in the first holding member 10 in the above embodiment. That is, the fitting portion 25 has an inner peripheral surface that is fitted on the outer peripheral surface of the collar-like portion 81, and an annular surface 25*a* having an annular shape, located on an axial second direction L2 side of this inner peripheral surface, and facing an axial first direction L1 side. A rotating-shaft insertion hole 16 having a larger diameter than the outer peripheral surface of the rotating shaft 80 is formed in the region of the first holding member 10 through which the rotating shaft 80 extends.

In the example shown in FIG. 5 as well, not only the bonding portion between the collar-like portion 81 and the fitting portion 25 (the first bonding portion 41) but also the bonding portion between the coupling bonding portion 22 and the coupling portion 11 (the second bonding portion 42) are positioned so as to be covered by neither the first holding member 10 nor the second holding member 20 as viewed in the axial direction L from the axial first direction L1 side, and both bonding portions are formed by welding from the axial first direction L1 side. In this configuration, even if the coupling portion 11 is not provided with the second bent portion 32, the welding depth can be properly controlled and bonding reliability can be enhanced. That is, as shown in FIG. 5, even in the configuration in which the distal end 12 of the coupling portion 11 faces the axial first direction L1 side, the bonding surface between the outer end face 12*a* (an end face of the distal end 12 which faces the radially outer side R2) and the inner surface 23*a* (the bonding surface of the second bonding portion 42), which extends in the axial direction L, can be positioned so as not to overlap the coupling portion 11 as viewed in the axial direction L from the axial first direction L1 side. Thus, even if the coupling portion 11 is not provided with the second bent portion 32, welding of not only the first bonding portion 41 but also the second bonding portion 42 can be performed from the axial first direction L1 side so that the welding depth direction is parallel to the bonding surface.

(2) The above embodiment is described with respect to an example in which the insertion opening 23 is a hole extending through the second holding member 20 in the axial direction L. However, embodiments of the present invention are not limited to this, and the insertion opening 23 may be a recessed portion in the axial direction L which opens only toward the holding member different from the holding member having the insertion opening 23 (in the example of FIG. 1, toward the axial first direction L1 side; in the example of FIG. 5, toward the axial second direction L2 side).

(3) The above embodiment is described with respect to an example in which the carrier 4 is fixed to the collar-like portion 81 of the rotating shaft 80. However, embodiments of the present invention are not limited to this, and the rotating shaft 80 may have an engagement portion other than the collar-like portion 81, and the carrier 4 may be fixed to the engagement portion. For example, in the configuration in which the rotating shaft 80 has a stepped portion coupling a smaller-diameter portion to a larger-diameter portion in the axial direction L, the stepped portion may be used as the engagement portion. A portion of the rotating shaft 80 whose outer diameter is uniform along the axial direction L may be used as it is as the engagement portion.

(4) The above embodiment is described with respect to an example in which the coupling portion 11 extends parallel to the axial direction L. However, embodiments of the present invention are not limited to this, and the coupling portion 11 may extend in a direction crossing the axial direction L at an angle of less than 90 degrees (e.g., 5 degrees, or 10 degrees).

(5) The above embodiment is described with respect to an example in which the outer end face 12*a* of the distal end 12 is formed in an arc shape having the same diameter as the inner surface 23*a*, and the outer end face 12*a* contacts the inner surface 23*a* from the radially inner side R1 along the entire length of the outer end face 12*a* in the circumferential direction C. However, embodiments of the present invention are not limited to this, and the outer end face 12*a* may contact the inner surface 23*a* from the radially inner side R1 along a part of the length of the outer end face 12*a* in the circumferential direction C.

(6) The above embodiment is described with respect to an example in which the welding region 70 in the bonding portion between the collar-like portion 81 and the fitting portion 15 (the first bonding portion 41) is a region including the end on the axial first direction L1 side of this bonding portion (the first bonding portion 41), and the welding region 70 in the bonding portion between the coupling bonding portion 22 and the coupling portion 11 (the second bonding portion 42) is a region including the end on the axial first direction L1 side of this bonding portion (the second bonding portion 42), that is, an example in which both the first bonding portion 41 and the second bonding portion 42 are formed by welding from the axial first direction L1 side. However, embodiments of the present invention are not limited to this, and the respective welding directions of the first bonding portion 41 and the second bonding portion 42 may be changed as appropriate independently of each other. For example, in the configuration shown in FIG. 1, the second bonding portion 42 may be formed by welding from the axial second direction L2 side.

(7) The above embodiment is described with respect to an example in which the collar-like portion 81 and the fitting portion 15 are bonded together by welding, and the coupling portion 11 and the insertion opening 23 are bonded together by welding. However, embodiments of the present invention are not limited to this, and at least one of the first bonding portion 41 as the bonding portion between the collar-like portion 81 and the fitting portion 15 and the second bonding portion 42 as the bonding portion between the coupling portion 11 and the insertion opening 23 may be formed by a fixing method other than welding. Examples of such a fixing method include fixing by fastening using a fastening member such as a bolt, and fixing by a clinching structure.

(8) The above embodiment is described with respect to an example in which the oil pump 90 can be driven by rotation of the ring gear 3 in addition to rotation of the carrier 4. However, the drive gear 7 and the second input gear 92 may not be provided, and the oil pump 90 can be driven only by rotation of the carrier 4.

(9) The above embodiment is described with respect to an example in which the outer peripheral gear 21 is placed so as to mesh with the input gear that drives the oil pump 90 (the first input gear 91). However, embodiments of the present invention are not limited to this, and various devices that are driven by mechanical power can be used as the device that is driven by the outer peripheral gear 21. The outer peripheral gear 21 is not limited to the gear that transmits rotation to another device. For example, the outer peripheral gear 21 may be a parking gear that locks the wheels while the vehicle is stopped, or the outer peripheral gear 21 may have spline teeth that fix a rotating member that rotates together with the carrier 4 (e.g., a friction plate of a clutch). Although the above embodiment is described with respect to an example in which the outer peripheral gear 21 is a spur gear, the outer peripheral gear 21 may be a gear having a configuration other than the spur gear (e.g., a helical gear).

(10) The above embodiment is described with respect to an example in which the carrier 4 formed by bonding the first holding member 10 and the second holding member 20 holds the three pinion shafts 6 from both sides in the axial direction L. However, embodiments of the present invention are not limited to this, and the number of pinion shafts 6 that are supported by the carrier 4 can be changed as appropriate. The number of coupling portions 11 that are formed in the first holding member 10 can be changed as appropriate, and the number of coupling portions 11 is not limited to the same as the number of pinion shafts 6 that are supported by the carrier 4, and can be set independently of the number of pinion shafts 6 that are supported by the carrier 4.

(11) The above embodiment is described with respect to an example in which the planetary gear mechanism 1 provided with the carrier 4 is a single-pinion type planetary gear mechanism. However, embodiments of the present invention are not limited to this, and the present invention is applicable to a carrier of a planetary gear mechanism in which pinion gears directly engaging with each other are provided between a pair of holding members (e.g., a double-pinion type planetary gear mechanism, and a Ravigneaux type planetary gear mechanism).

(12) Regarding other configurations as well, the embodiments disclosed in the specification are by way of example only in all respects, and embodiments of the present invention are not limited to them. That is, it is to be understood that configurations obtained by partially modifying as appropriate the configurations that are not described in the claims of the present application also fall in the technical scope of the present invention, as long as these configurations include the configurations described in the claims and the configurations equivalent thereto.

The present invention is used for planetary gear mechanisms, and can be preferably used for carriers that are fixed so as to rotate together with a rotating shaft.

What is claimed is:

1. A carrier that is used in a planetary gear mechanism and is fixed so as to rotate together with a rotating shaft, comprising:

a pair of holding members that hold from both sides in an axial direction a pinion shaft supporting a pinion gear, wherein a first holding member as one of the pair of holding members includes a coupling portion extending in the axial direction toward a second holding member as the other holding member, the second holding member is a disc-like member, and has an external outer peripheral gear integrally formed in its outer peripheral portion, the coupling portion is bonded to a coupling bonding portion provided on a radially inner side of the outer peripheral gear in the second holding member, the rotating shaft includes a collar-like portion that is extended in a radial direction with respect to an outer peripheral surface of the rotating shaft, the coupling bonding portion includes an insertion opening in which a distal end of the coupling portion is inserted, at least one of the first holding member and the second holding member includes a fitting portion that is fitted on the collar-like portion, and the collar-like portion and the fitting portion are bonded together by welding, and the coupling portion and the insertion opening are bonded together by welding.

2. The carrier according to claim 1, wherein the first holding member includes the fitting portion, the coupling portion includes a bent portion that is bent so that the distal end extends toward a radially outer side, and an outer end face as an end face of the distal end which faces the radially outer side, and the outer end face of the coupling portion and an inner surface of the insertion opening which faces the radially inner side are bonded together so as to face each other in the radial direction.

3. The carrier according to claim 2, wherein an axial first direction is a direction from the holding member not provided with the fitting portion toward the holding member provided with the fitting portion in the axial direction, a welding region in a bonding portion between the collar-like portion and the fitting portion is a region including an end of the bonding portion on the axial first direction side, and a welding region in a bonding portion between the coupling bonding portion and the coupling portion is a region including an end of the bonding portion on the axial first direction side.

4. The carrier according to claim 1, wherein an axial first direction is a direction from the holding member not provided with the fitting portion toward the holding member provided with the fitting portion in the axial direction, a welding region in a bonding portion between the collar-like portion and the fitting portion is a region including an end of the bonding portion on the axial first direction side, and a welding region in a bonding portion between the coupling bonding portion and the coupling portion is a region including an end of the bonding portion on the axial first direction side.

* * * * *